(12) United States Patent
Kim et al.

(10) Patent No.: US 12,280,748 B2
(45) Date of Patent: Apr. 22, 2025

(54) ANTI-STICKING DEVICE OF INLET ACTUATOR

(71) Applicants: Hyundai Motor Company, Seoul (KR); Kia Corporation, Seoul (KR)

(72) Inventors: Seung Woo Kim, Anyang-si (KR); Dae Hyun Kim, Bucheon-si (KR); Dong Geon Lee, Mungyeong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 549 days.

(21) Appl. No.: 17/741,603

(22) Filed: May 11, 2022

(65) Prior Publication Data

US 2023/0150456 A1   May 18, 2023

(30) Foreign Application Priority Data

Nov. 16, 2021  (KR) .......................... 10-2021-0157742

(51) Int. Cl.
*B60L 53/00* (2019.01)
*B60L 53/16* (2019.01)
*B60S 1/62* (2006.01)
*H01R 13/629* (2006.01)

(52) U.S. Cl.
CPC ................. *B60S 1/62* (2013.01); *B60L 53/16* (2019.02); *H01R 13/62905* (2013.01)

(58) Field of Classification Search
CPC .......................... B60L 53/16; H01R 13/62905
See application file for complete search history.

(56) References Cited

U.S. PATENT DOCUMENTS

| | | | |
|---|---|---|---|
| 6,267,430 B1* | 7/2001 | Cresseaux | B60N 2/0732 296/65.01 |
| 11,660,986 B2* | 5/2023 | Shim | B60N 2/067 248/430 |
| 12,122,265 B2* | 10/2024 | Xiao | B60N 2/073 |
| 2020/0108729 A1 | 4/2020 | Tsukamoto | |

FOREIGN PATENT DOCUMENTS

JP          2020061795 A     4/2020

\* cited by examiner

*Primary Examiner* — Phuong Chi Thi Nguyen
(74) *Attorney, Agent, or Firm* — Slater Matsil, LLP

(57) ABSTRACT

An embodiment device includes a housing, an actuator mounted in the housing, the actuator configured to be operated in response to a connection state of a charging plug, a drive shaft configured to be rotated in conjunction with an operation of the actuator, a lever arm rotatably provided outside the housing and connected to the drive shaft to be rotated together with the drive shaft, and a brush unit seated on the lever arm and configured to remove debris between the housing and the lever arm while being in contact with the housing during operation of the lever arm.

20 Claims, 10 Drawing Sheets

ANTI-STICKING DEVICE OF INLET ACTUATOR

CROSS-REFERENCE TO RELATED APPLICATIONS

This application claims the benefit of Korean Patent Application No. 10-2021-0157742, filed on Nov. 16, 2021, which application is hereby incorporated herein by reference.

TECHNICAL FIELD

The present invention relates generally to an anti-sticking device of an inlet actuator.

BACKGROUND

Recently, an electric mobility, which is an eco-friendly vehicle, has been commercialized. Such an electric mobility is powered by a rechargeable battery system, and a battery charging system for charging electric power of the electric mobility is mounted in the electric mobility.

The electric mobility is designed such that when a charging plug connected to an external power source is connected thereto, a battery thereof can be charged by receiving power from the external power source.

The battery charging system includes a receptacle configured to receive the charging plug and interface with the charging plug. The interface between the charging plug and the receptacle of the electric vehicle may be of any standard configuration that allows current to be transmitted from a charging unit to the mobility and battery.

However, when an unauthorized person disconnects the charging plug while charging of the electric mobility is being performed, the charging cannot be continuously performed and the charging of the battery cannot be fully performed. In addition, damage to the electrical mobility or the charging plug may occur when the charging plug is forcibly removed from the receptacle during charging operation due to the current flowing through the interface.

To solve the above problem, the electric mobility may include a locking device configured to secure the charging plug against removal from the receptacle.

The locking device is called an inlet actuator, and the inlet actuator is operated when the charging plug is connected to the receptacle to prevent the charging plug from being separated from the receptacle. Conversely, when the battery is fully charged and the charging plug is removed, the inlet actuator is operated and allows the charging plug to be removed.

However, when the inlet actuator is broken down or each component constituting the inlet actuator is stuck by debris, an action to mount or release the charging plug is not performed.

The foregoing is intended merely to aid in the understanding of the background of the present invention, and is not intended to mean that the present invention falls within the purview of the related art that is already known to those skilled in the art.

SUMMARY

The present invention relates generally to an anti-sticking device of an inlet actuator. Particular embodiments relate to an anti-sticking device of an inlet actuator in which the anti-sticking device is configured to prevent an inoperable situation of the inlet actuator from occurring when a lever operated in conjunction with the inlet actuator is stuck by an ingress of debris.

Accordingly, embodiments of the present invention keep in mind problems occurring in the related art, and embodiments of the present invention provide an anti-sticking device of an inlet actuator, wherein when an inlet actuator provided for locking or releasing a charging plug is broken, a lever arm exposed outside a housing performs a locking or releasing operation for the charging plug. Another embodiment of the present invention provides an anti-sticking device of an inlet actuator, the anti-sticking device being configured to prevent a lever arm from being stuck due to debris to prevent an inoperable situation of the inlet actuator occurring by sticking of the lever arm.

According to one embodiment of the present invention, there is provided an anti-sticking device of an inlet actuator, the anti-sticking device including a housing in which an actuator operated in response to a connection state of a charging plug is mounted, a drive shaft configured to be rotated in conjunction with operation of the actuator, a lever arm rotatably provided outside the housing and connected to the drive shaft to be rotated together with the drive shaft, and a brush unit seated on the lever arm and configured to remove debris generated between the housing and the lever arm while being in contact with the housing during operation of the lever arm.

The brush unit may include a connection portion and an extension portion, the connection portion being connected to the drive shaft and the extension portion being extended from the connection portion along the lever arm and including a debris removal portion in contact with the housing.

The drive shaft may include a gear part axially rotated together with the drive shaft, and the connection portion of the brush unit may be arranged to be perpendicular to the drive shaft and engaged with the gear part.

The lever arm may have a seating groove portion depressed from the lever arm such that the brush unit may be inserted thereinto, and the connection portion and the extension portion of the brush unit may have circular circumferential surfaces so as to be rotatable when being seated in the seating groove portion.

The connection portion of the brush unit may have a gear connection section and a rotation section arranged along an outer circumferential surface thereof, the gear connection section being formed to be engaged to the gear part and the rotation section being inserted in the seating groove portion and shaped in an arc shape.

When the drive shaft is rotated, the brush unit may be moved together with the lever arm and perform a tilting movement, and the debris removal portion may be rotated in a trajectory along the arc shape.

In the housing, a portion in contact with the debris removal portion may be shaped in a curved surface along the rotation trajectory of the debris removal portion.

The debris removal portion may be formed such that a section thereof may be gradually reduced in a width thereof toward the housing.

The debris removal portion may include a plurality of elastic bodies, the plurality of elastic bodies being configured to be elastically deformable and arranged along the extension portion.

The brush unit may include the connection portion and the extension portion that may be removably provided, and the debris removal portion may be rotatably connected to the extension portion.

The lever arm may have a first slot and a second slot, the first slot receiving the connection portion therein and the second slot communicating with the first slot and extended such that the debris removal portion may be inserted into the second slot in a longitudinal direction thereof.

Fixation ends may be extended from the extension portion in opposite directions of the debris removal portion, and the second slot of the lever arm may have the same shape as a section of the extension portion.

A connection means may be provided at an end of the debris removal portion, and a locking means may be provided at a center portion of the connection portion to be coupled to the connection means.

The anti-sticking device may include a controller controlling the actuator, wherein the controller may store a number of rotations of the lever arm in response to operation of the actuator, and when the number of rotations of the lever arm reaches a preset number of rotations, the controller may control the operation of the actuator so as to increase the rotation range of the lever arm beyond the preset range.

According to the anti-sticking device of the inlet actuator having the structure described above, when the inlet actuator provided to lock or release the charging plug is broken down, the lever arm exposed outside the housing performs a locking or releasing operation of the charging plug. Specifically, as the debris generated between the lever arm and the housing is removed, sticking due to the debris is prevented and an inoperable situation of the inlet actuator is prevented.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Hereinbelow, an anti-sticking device of an inlet actuator according to embodiments of the present invention will be described with reference to the accompanying drawings.

Figure 1:
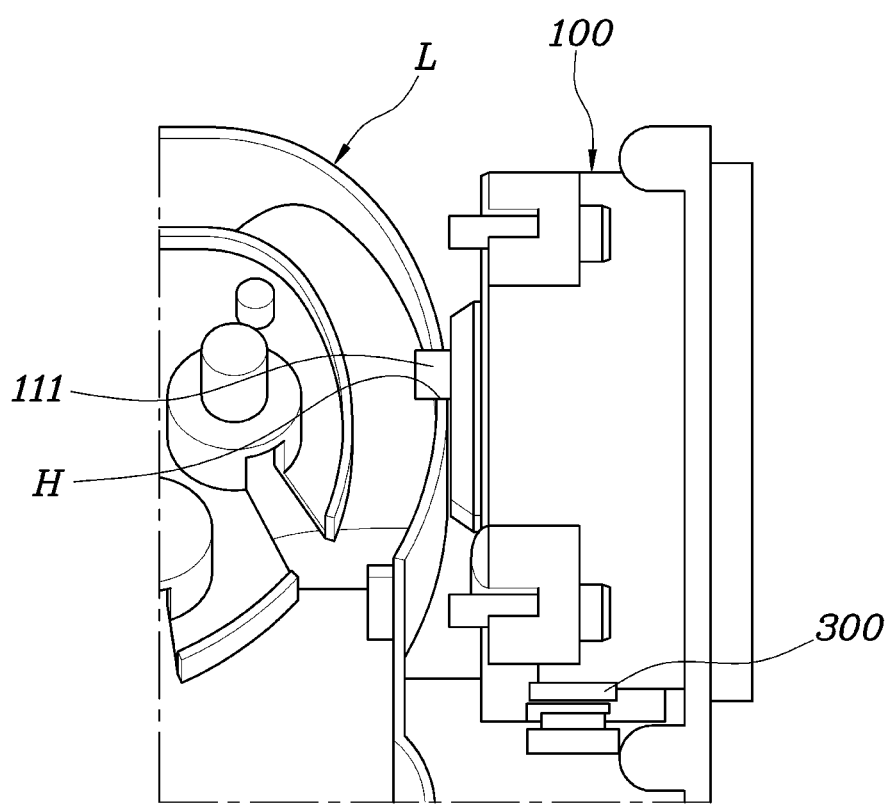
FIG. 1 is a view showing an inlet actuator and an inlet body according to embodiments of the present invention.
Figure 2:
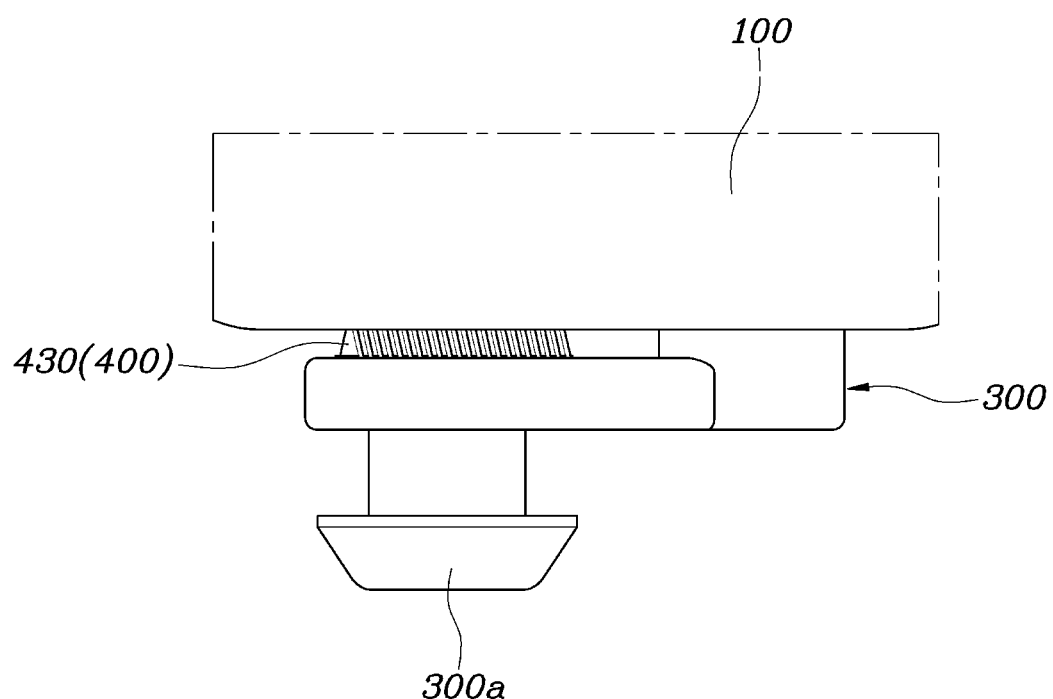
FIG. 2 is a view showing an anti-sticking device of an inlet actuator according to embodiments of the present invention.
Figure 3:
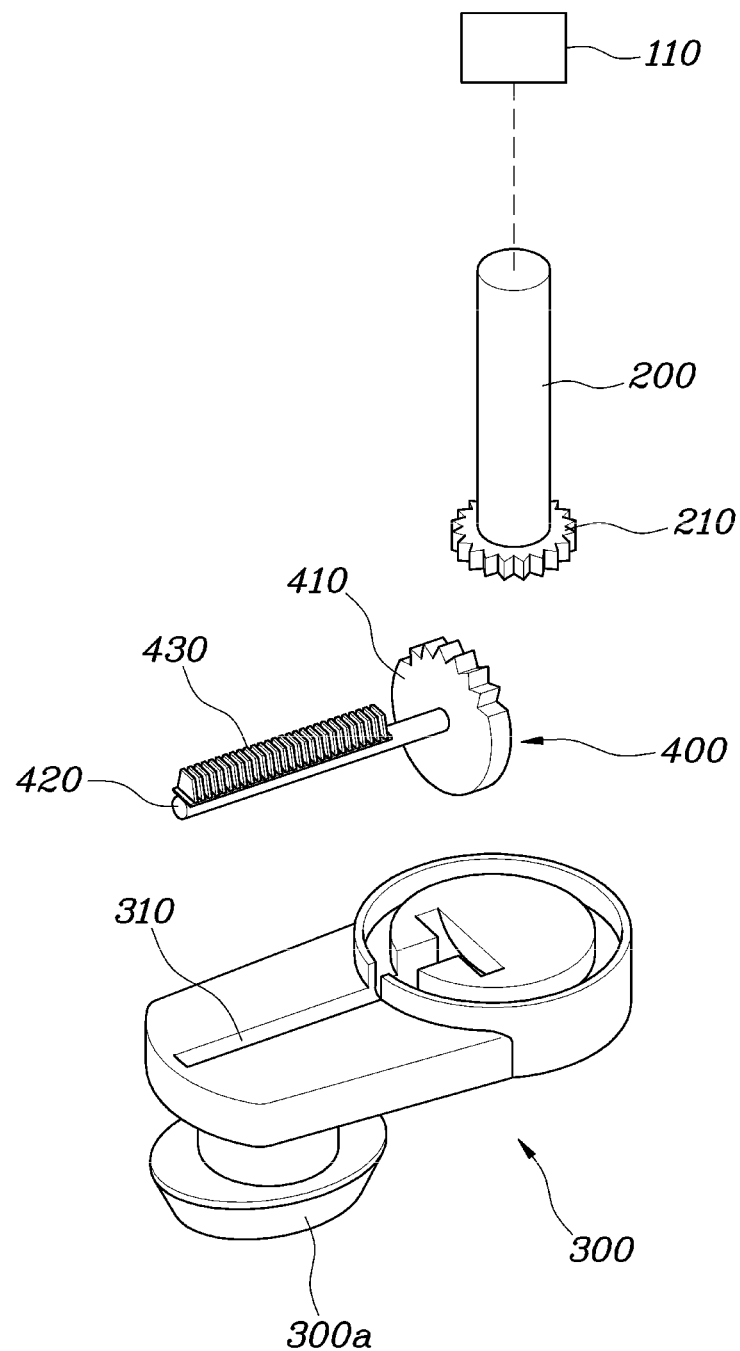
FIG. 3 is an assembling view showing the anti-sticking device of the inlet actuator shown in FIG. 1.
Figure 4:
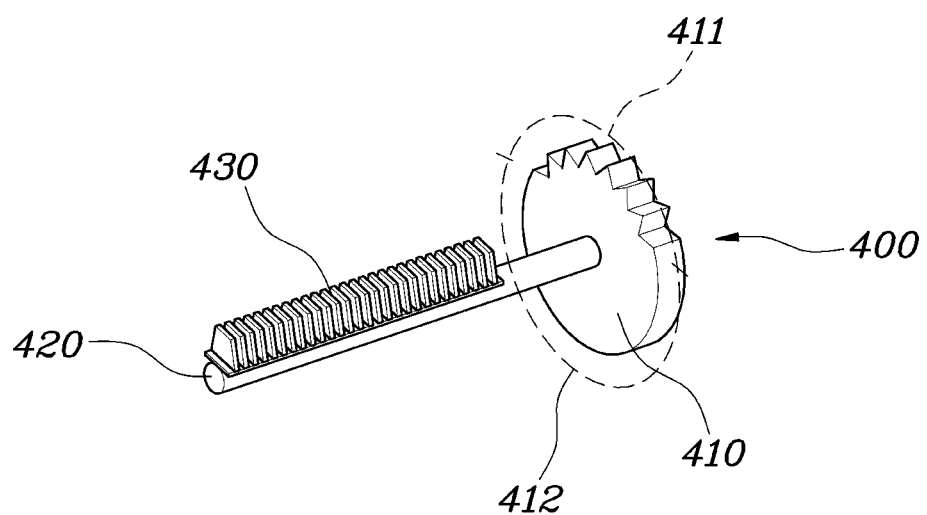
FIG. 4 is a view showing a brush unit according to an embodiment of the present invention.
Figure 5:
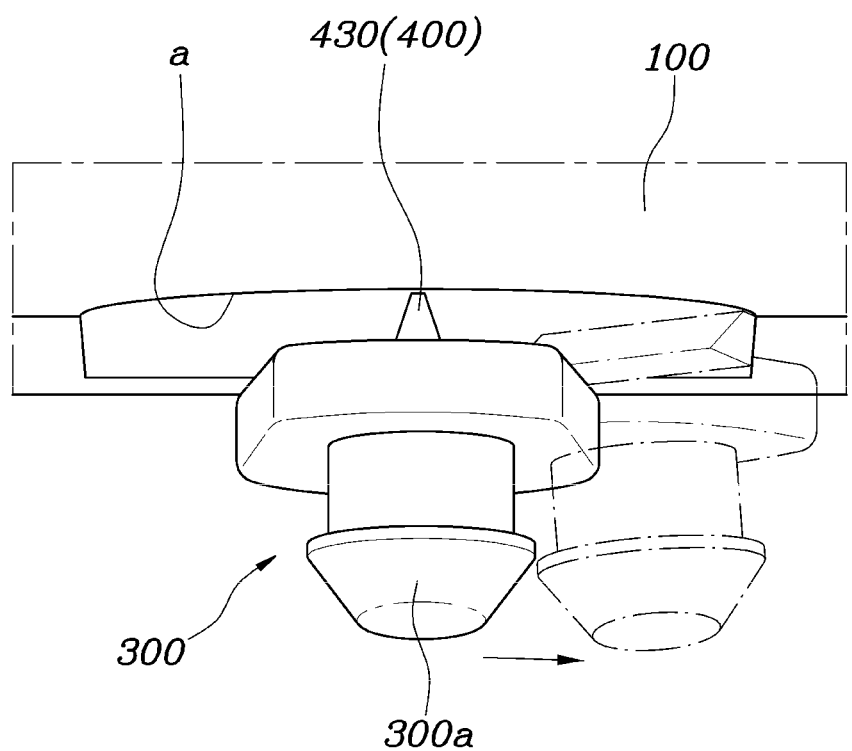
FIG. 5 is a view showing operation of the brush unit according to embodiments of the present invention.
Figure 6:
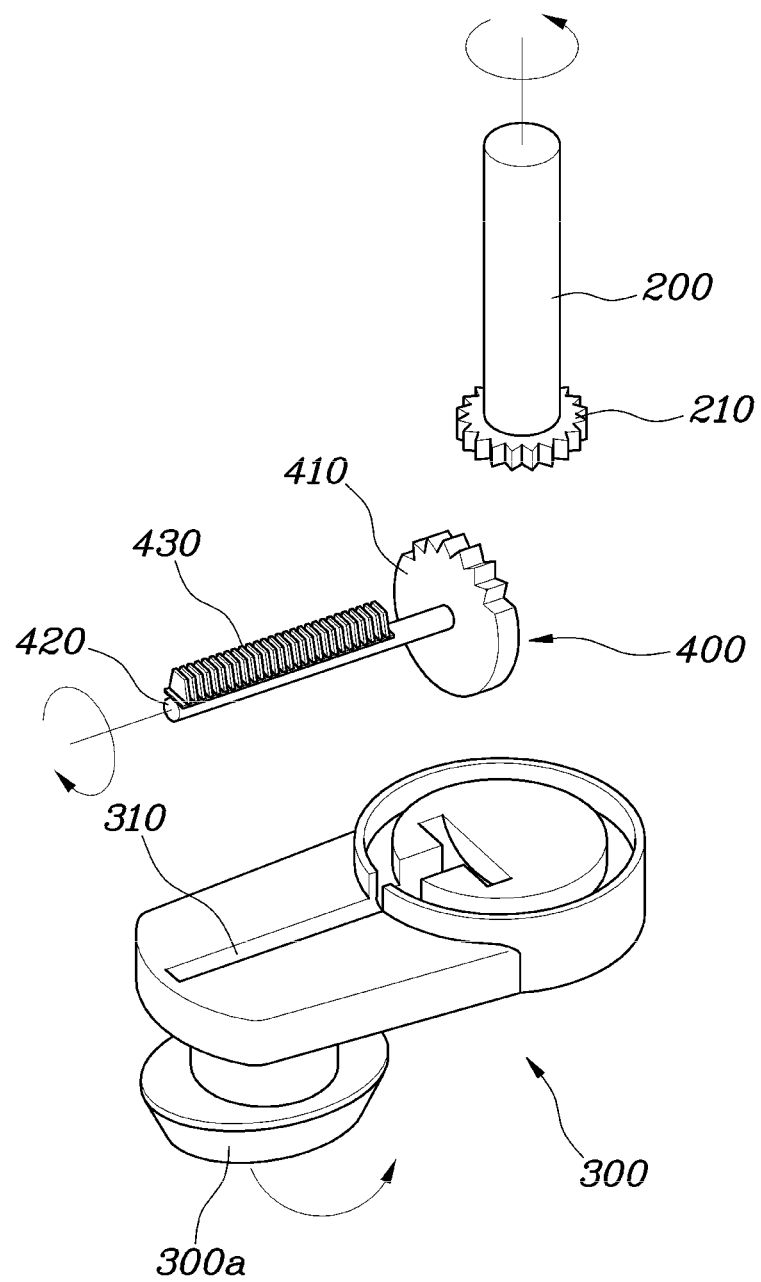
FIG. 6 is a view showing actual operation of the anti-sticking device of an inlet actuator according to embodiments of the present invention.
Figure 7:
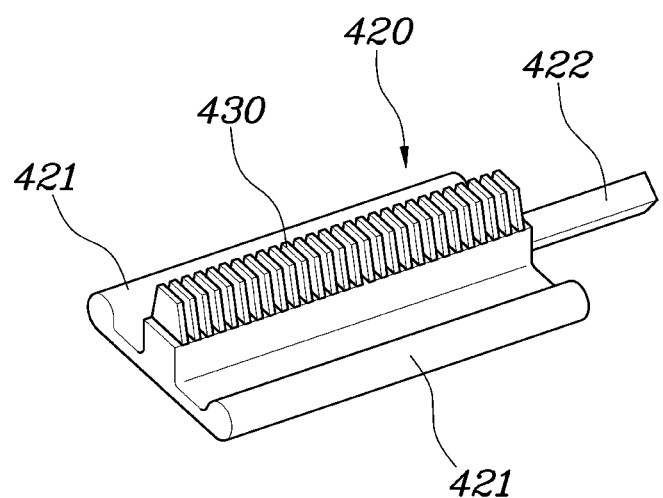
FIG. 7 is a view showing the brush unit according to another embodiment of the present invention.
Figure 8:
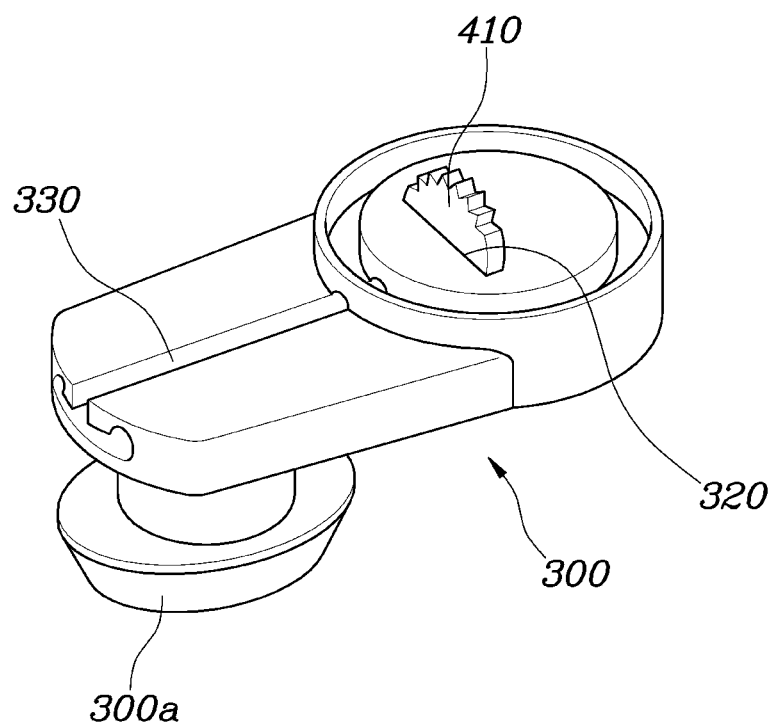
FIG. 8 is a view showing a lever arm according to another embodiment of the present invention.
Figure 9:
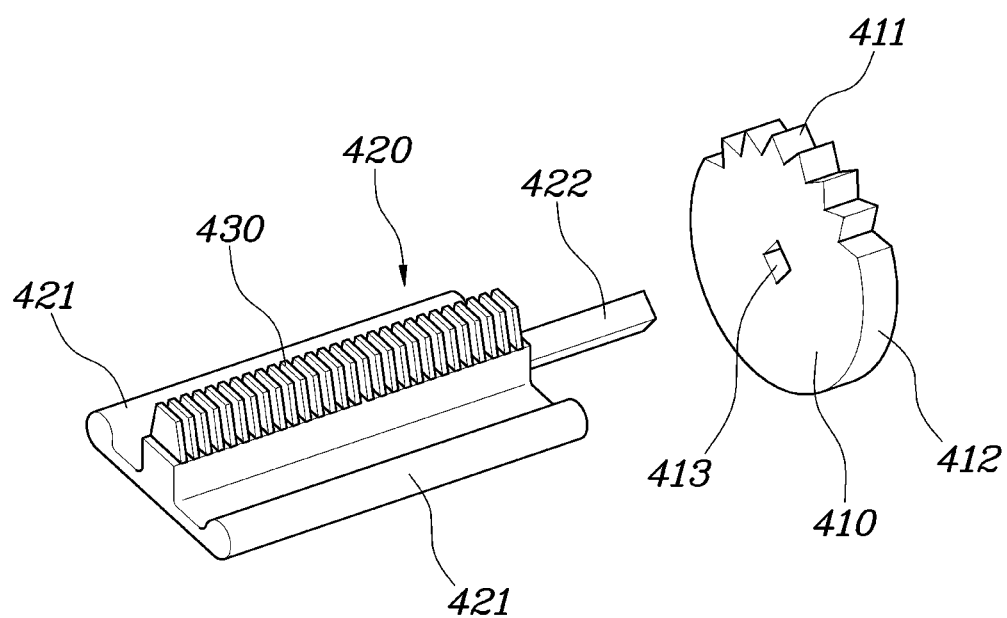
FIG. 9 is a view showing the brush unit shown in FIG. 7.
Figure 10:
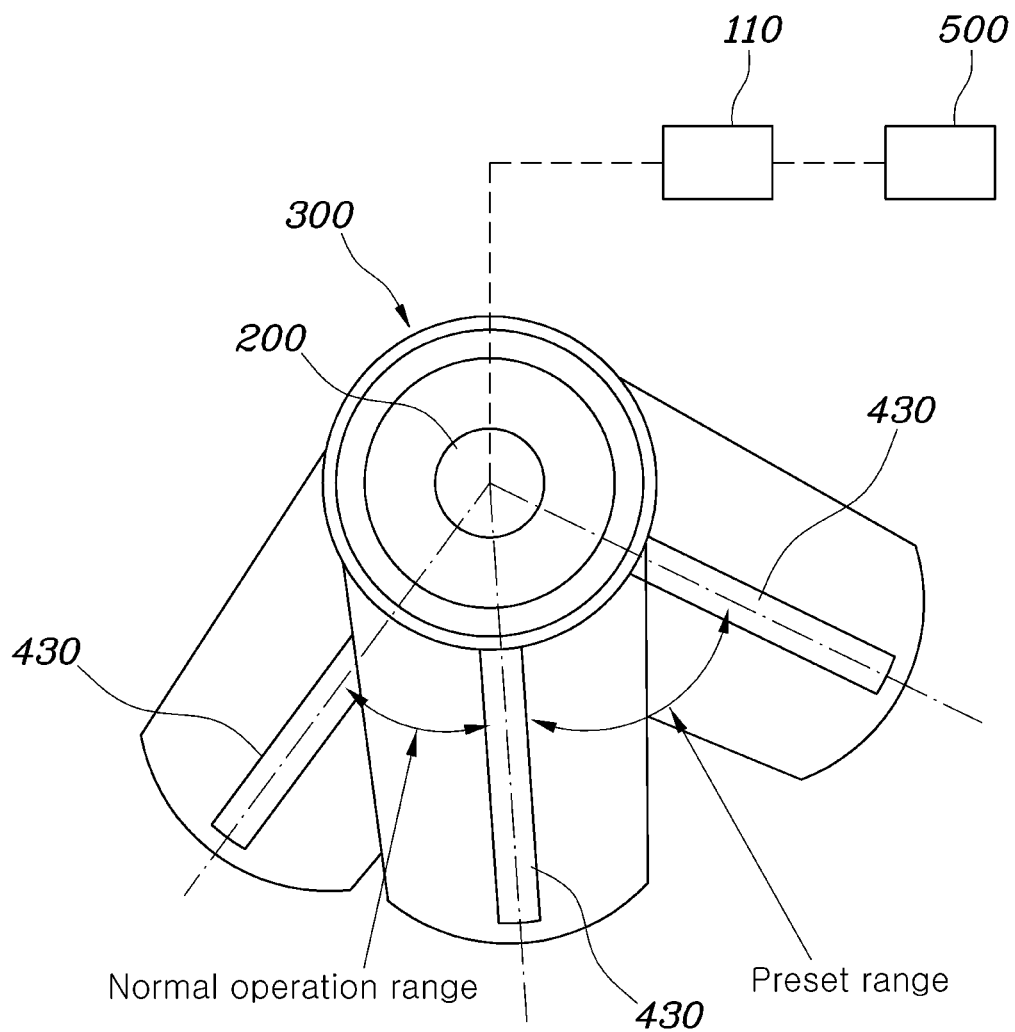
FIG. 10 is a view showing control for anti-sticking of the inlet actuator.

FIG. 1 is a view showing an inlet actuator and an inlet body according to embodiments of the present invention. FIG. 2 is a view showing an anti-sticking device of an inlet actuator according to embodiments of the present invention. FIG. 3 is an assembling view showing the anti-sticking device of the inlet actuator shown in FIG. 1. FIG. 4 is a view showing a brush unit according to an embodiment of the present invention. FIG. 5 is a view showing operation of the brush unit according to embodiments of the present invention. FIG. 6 is a view showing actual operation of the anti-sticking device of an inlet actuator according to embodiments of the present invention. FIG. 7 is a view showing the brush unit according to another embodiment of the present invention. FIG. 8 is a view showing a lever arm according to another embodiment of the present invention. FIG. 9 is a view showing the brush unit shown in FIG. 7. FIG. 10 is a view showing control for anti-sticking of the inlet actuator.

According to embodiments of the present invention, as shown in FIGS. 1 to 3, the anti-sticking device of an inlet actuator includes a housing 100 in which an actuator no operated in response to a connection state of a charging plug is mounted, a drive shaft 200 rotated in conjunction with operation of the actuator no, a lever arm 300 rotatably provided outside the housing 100 and connected to the drive shaft 200 and rotated together with the drive shaft 200, and a brush unit 400 seated on the lever arm 300 and removing debris generated between the housing 100 and the lever arm 300 while being in contact with the housing 100 in rotation of the lever arm 300.

Herein, the housing 100 may be provided in a vehicle body, and the actuator no mounted in the housing 100 is selectively operated in response to a connection state of the charging plug. Accordingly, the connected charging plug may be locked or released.

As shown in FIG. 1, the actuator no includes a locking pin 111. The locking pin 111 enters or retracts from a locking hole H provided in an inlet body L in response to operation of the actuator no to prevent or allow separation of the charging plug.

The actuator no includes the drive shaft 200 to transmit rotational power. The drive shaft 200 may be connected to the locking pin 111 by a medium of a gear unit.

Furthermore, the drive shaft 200 is connected to the lever arm 300 rotatably provided outside the housing 100. When the actuator no is broken down, the lever arm 300 is provided for manipulation for preventing or allowing separation of the charging plug manually, and the lever arm 300 is provided outside the housing 100. Therefore, the lever arm 300 may include a locking part 300*a* to allow manual manipulation in a specific situation such as a breakdown of the actuator 110.

However, as the lever arm 300 is arranged outside the housing 100, a stuck situation due to the debris may occur. The stuck situation restrains movement of the lever arm 300 and thus a problem in which the actuator 110 is prevented from being normally driven may occur.

Therefore, embodiments of the present invention are configured such that the brush unit 400 is seated on the lever arm 300 and the brush unit 400 is in contact with the housing 100, so that the debris generated between the housing 100 and the lever arm 300 is removed when the lever arm 300 is rotated by operation of the actuator no.

In other words, the lever arm 300 is rotated with operation of the actuator no provided to lock or release the charging plug. When the lever arm 300 is rotatably moved, the brush unit 400 removes the debris between the housing 100 and the lever arm 300, so that the lever arm 300 is rotatably moved normally.

As described above, the anti-sticking device of embodiments of the present invention does not require a separate cover provided to protect the lever arm 300 from the debris. Accordingly, the entire size of the anti-sticking device is reduced and maintenance convenience is improved with removal of a cover detachment process.

When describing embodiments of the present invention in detail, as shown in FIGS. 3 to 5, the brush unit 400 includes a connection portion 410 connected to the drive shaft 200 and an extension portion 420 extended from the connection portion 410 along the lever arm 300. The extension portion 420 includes a debris removal portion 430 in contact with the housing 100.

Furthermore, the lever arm 300 has a seating groove portion 310 depressed from the lever arm 300 so as to receive the brush unit 400, and the connection portion 410 and the extension portion 420 of the brush unit 400 have circular circumferential surfaces so as to be rotatable when being seated in the seating groove portion 310.

Herein, the debris removal portion 430 has a section that is gradually reduced in a width thereof toward the housing 100, and when the lever arm 300 is rotated, the debris removal portion 430 may be moved to sweep debris generated on the housing 100.

Furthermore, the debris removal portion 430 has a plurality of elastic bodies configured to be elastically deformable and arranged along the extension portion 420. As described above, as the debris removal portion 430 is configured to be elastically deformable, the debris removal portion 430 may be in close contact with the housing 100, and the debris may be scattered and removed by a force by which the plurality of elastic bodies is elastically recovered from a state in which the plurality of elastic bodies is rubbed against the housing 100.

Meanwhile, the brush unit 400 may include the connection portion 410 and the extension portion 420 integrally coupled to each other. The extension portion 420 may include the debris removal portion 430 in contact with the housing 100. As described above, as the brush unit 400 has the circular circumferential surface, the brush unit 400 may be rotated when being seated in the seating groove portion 310 of the lever arm 300. Furthermore, the seating groove portion 310 of the lever arm 300 is formed such that the connection portion 410 and the extension portion 420 of the brush unit 400 are partially inserted thereinto. Accordingly, the debris removal portion 430 exposed outside the seating groove portion 310 may be in contact with the housing 100.

Herein, the connection portion 410 is connected to the drive shaft 200 and is rotated together with rotation of the drive shaft 200 in response to operation of the actuator no. The connection portion 410 and the drive shaft 200 may be connected to each other by a gear connection structure.

The extension portion 420 is extended from the connection portion 410 along the lever arm 300 and the debris removal portion 430 provided on the extension portion 420 removes the debris located within a rotation trajectory of the lever arm 300.

Specifically, the drive shaft 200 includes a gear part 210 axially rotated together with the drive shaft 200. The connection portion 410 of the brush unit 400 is arranged to be perpendicular to the drive shaft 200 and is engaged with the gear part 210.

As described above, the drive shaft 200 includes the gear part 210 on which gear protrusions are formed along a circumferential surface thereof. The connection portion 410 has gear protrusions along the circumferential surface thereof, the gear protrusions of the connection portion 410 being engaged with the gear protrusions of the gear part 210. Therefore, the gear part 210 and the connection portion 410 may be engaged with each other.

Herein, the connection portion 410 of the brush unit 400 has a gear connection section 411 and a rotation section 412 that are arranged along the outer circumferential surface of the connection portion 410. The gear connection section 411 is formed to be engaged with the gear part 210 and the rotation section 412 is inserted into the seating groove portion 310 and shaped in an arc shape. Therefore, the connection portion 410 is engaged with the gear part 210 by the gear connection section 411, so that when the drive shaft 200 is rotated, the connection portion 410 may be rotated in conjunction with the drive shaft 200. The smooth rotation of the connection portion 410 may be performed as the arc-shaped rotation section 412 is in contact with the seating groove portion 310 of the lever arm 300. Therefore, the brush unit 400 is operated in conjunction with the drive shaft 200 by the gear connection section 411, and the brush unit 400 may perform smooth rotation in the seating groove portion 310 of the lever arm 300 by the rotation section 412.

Meanwhile, the drive shaft 200 and the connection portion 410 are arranged to be perpendicular to each other, so that when the drive shaft 200 is laterally rotated, the connection portion 410 is vertically rotated. In other words, as the drive shaft 200 is coupled to the lever arm 300, the drive shaft 200 and the lever arm 300 are rotated in the same lateral direction, and the brush unit 400 is seated on the lever arm 300 and is rotatably moved together with the lever arm 300 and additionally performs vertical rotation.

As described above, the brush unit 400 is rotatably moved together with the lever arm 300 when the drive shaft 200 is rotated. At the same time, the brush unit 400 is tilted while being vertically rotated, so that the debris removal portion 430 is rotated in a trajectory of the arc shape. Accordingly, the debris removal portion 430 may be moved to sweep debris generated on the housing 100.

In addition, the housing 100 has a portion 'a' in contact with the debris removal portion 430 that is formed in a curved surface along the rotation trajectory of the debris removal portion 430. Accordingly, the debris removal portion 430 rotated in the trajectory of the arc shape may maintain an even contact state against the housing 100. In other words, when a portion of the housing 100 in contact with the debris removal portion 430 is shaped in a flat surface, an excessive force is applied to the portion when the debris removal portion 430 is located in a direction perpendicular to the housing 100, and the debris removal portion 430 may be damaged.

Accordingly, in the housing 100, the portion corresponding to the rotation trajectory of the lever arm 300 is shaped in a curved surface. Therefore, the debris removal portion 430 rotated together with the lever arm 300 while being in contact with the housing 100 can uniformly remove the debris generated on the housing 100, and a problem caused when a load is concentrated at a predetermined section can be removed.

As described above, the brush unit 400 is rotated together with the lever arm 300 when the drive shaft 200 is rotated according to operation of the actuator no and is tilted in conjunction with the drive shaft 200. Therefore, the debris removal portion 430 is operated to sweep the debris generated on the housing 100 and the debris can be efficiently removed.

In other words, as shown in FIG. 6, when the drive shaft 200 is rotated counterclockwise, the lever arm 300 is rotated counterclockwise together with the drive shaft 200 and the brush unit 400 engaged with the drive shaft 200 is tilted clockwise. Therefore, as shown in FIG. 5, the debris removal portion 430 of the brush unit 400 is moved together with the lever arm 300 and tilted to generate inclination, so that the debris removal portion 430 removes the debris by sweeping the debris.

Meanwhile, as another embodiment, as shown in FIGS. 7 to 9, the brush unit 400 removably includes the connection portion 410 and the extension portion 420, and the debris removal portion 430 is rotatably connected to the extension portion 420.

Herein, the connection portion 410 is arranged to be perpendicular to the drive shaft 200, and the debris removal portion 430 is connected to a center portion of the connection portion 410.

As described above, the connection portion 410 and the extension portion 420 are separately and removably provided in the brush unit 400, so that the extension portion 420 with the debris removal portion 430 may be replaced.

In other words, the debris removal portion 430 generates friction against the housing 100, and replacement is required due to damage or friction of the debris removal portion 430. Therefore, the extension portion 420 including the debris removal portion 430 is provided separately from the connection portion 410, thereby allowing the extension portion 420 to be replaced.

Herein, the debris removal portion 430 is rotatably coupled to the extension portion 420 by a hinge connection structure and is connected to the connection portion 410 and rotated together with the connection portion 410. Therefore, when the actuator no is operated, the debris removal portion 430 may be operated in sweeping the debris generated on the housing 100.

Specifically, the lever arm 300 includes a first slot 320 in which the connection portion 410 is seated and a second slot 330 communicating with the first slot 320 and extended to receive the debris removal portion 430 in a longitudinal direction thereof.

As described above, as the lever arm 300 includes the first slot 320 and the second slot 330, the connection portion 410, the extension portion 420, and the debris removal portion 430 that constitute the brush unit 400 may be seated on the lever arm 300.

Herein, the first slot 320 is shaped in a circular groove corresponding to the shape of the connection portion 410 to allow the connection portion 410 to be rotated in the first slot 320.

The second slot 330 is extended along a longitudinal direction of the lever arm 300 so that the extension portion 420 is slidingly assembled into the second slot 330. Furthermore, as the second slot 330 communicates with the first slot 320, the debris removal portion 430 provided on the extension portion 420 may be connected to the connection portion 410 located in the first slot 320. Since the debris removal portion 430 provided on the extension portion 420 should be exposed while the extension portion 420 is assembled, the second slot 330 described above is formed to open in a direction facing the housing 100.

Meanwhile, fixation ends 421 are extended from the extension portion 420 in opposite directions of the debris removal portion 430, and the second slot 330 of the lever arm 300 may be shaped in the same shape as a section of the extension portion 420.

In other words, the extension portion 420 may have a T-shaped section by the debris removal portion 430 and the fixation ends 421, and the second slot 330 of the lever arm 300 is also shaped in the same shape as the section of the extension portion 420, so that vertical separation except for separation in an assembly direction is prevented in assembly between the extension portion 420 and the second slot 330. Furthermore, when the extension portion 420 is assembled with the second slot 330 of the lever arm 300, the fixation ends 421 provide a support structure of the extension portion 420 so that shaking of the extension portion 420 is prevented and solidity is secured.

Meanwhile, a connection means 422 is provided at an end of the debris removal portion 430, and a locking means 413 coupled to the connection means 422 may be provided at the center portion of the connection portion 410.

Herein, the connection means 422 protrudes from the end of the debris removal portion 430 and may be shaped in a polygonal shape, and the locking means 413 penetrates the center portion of the connection portion 410 and may be shaped in the same shape as the shape of the connection means 422. A connection structure using a magnetic body may be applied to the connection between the connection means 422 and the locking means 413 in addition to an insertion connection structure.

Therefore, the debris removal portion 430 and the connection portion 410 may be connected to each other by mutual coupling between the connection means 422 and the locking means 413 and may be rotated together.

Meanwhile, the actuator no described above is controlled by a controller 500. The controller 500 stores the number of rotations of the lever arm 300 according to an operation of the actuator 110, and when the number of rotations of the lever arm 300 reaches a preset number of rotations, the controller 500 may control operation of the actuator no so that a rotation range of the lever arm 300 exceeds a preset range.

In other words, the controller 500 accumulates and stores the number of rotations of the lever arm 300 according to the control of operation of the actuator 110. Specifically, the controller 500 stores the preset number of rotations and the preset range for controlling the actuator 110 according to rotation of the lever arm 300. Herein, the preset number of rotations may be preset by being calculated by experimenting in advance debris removal efficiency in which the debris removal portion 430 removes debris on the housing 100 as the lever arm 300 is rotated, and the preset range may be preset as a rotation radius greater than a rotation radius of the lever arm 300 in operation of the actuator 110 in response to separation prevention or separation allowance of the charging plug.

As shown in FIG. 10, when the number of rotations of the lever arm 300 reaches the preset number, the controller 500 controls operation of the actuator 110 so that the rotation range of the lever arm 300 is greater than or equal to the preset range. Therefore, the lever arm 300 is rotated by a rotation radius greater than a normal rotation radius, so that the debris removal portion 430 may remove debris on the housing 100 with a wider range. Therefore, as the debris generated on the housing 100 is removed in advance with a wider range, a problem caused by debris to be accumulated later can be prevented.

According to the anti-sticking device of the actuator 110 having the structure described above, when the actuator 110 provided to lock or release the charging plug is broken down, the lever arm 300 exposed outside the housing 100 performs a locking or releasing operation of the charging plug. Specifically, as the debris generated between the lever arm 300 and the housing 100 is removed, sticking due to the debris is prevented and an inoperable situation of the inlet actuator is prevented.

Although the preferred embodiments of the present invention have been disclosed for illustrative purposes, those skilled in the art will appreciate that various modifications, additions, and substitutions are possible, without departing from the spirit and scope of the present invention.

What is claimed is:

1. A device comprising:
   a housing;
   an actuator mounted in the housing, the actuator configured to be operated in response to a connection state of a charging plug;
   a drive shaft configured to be rotated in conjunction with an operation of the actuator;
   a lever arm rotatably provided outside the housing and connected to the drive shaft to be rotated together with the drive shaft; and
   a brush unit seated on the lever arm and configured to remove debris between the housing and the lever arm while being in contact with the housing during operation of the lever arm.

2. The device of claim 1, further comprising a controller configured to:
   store a number of rotations of the lever arm in response to the operation of the actuator; and
   control the operation of the actuator so as to increase a rotation range of the lever arm beyond a preset range in response to the number of rotations of the lever arm reaching a preset number of rotations.

3. The device of claim 1, wherein the brush unit comprises:
   a connection portion connected to the drive shaft; and
   an extension portion extended from the connection portion along the lever arm and comprising a debris removal portion in contact with the housing.

4. The device of claim 3, wherein a section of the debris removal portion is gradually reduced in a width thereof toward the housing.

5. The device of claim 3, wherein the debris removal portion comprises a plurality of elastic bodies, the plurality of elastic bodies being elastically deformable and arranged along the extension portion.

6. The device of claim 3, wherein the brush unit comprises the connection portion and the extension portion that are removably provided, and the debris removal portion is rotatably connected to the extension portion.

7. The device of claim 6, further comprising:
   a connection structure provided at an end of the debris removal portion; and
   a locking structure provided at a center portion of the connection portion and configured to be coupled to the connection structure.

8. The device of claim 6, wherein the lever arm comprises:
   a first slot configured to receive the connection portion therein; and
   a second slot in communication with the first slot and extended to receive the debris removal portion in a longitudinal direction thereof.

9. The device of claim 8, further comprising fixation ends extended from the extension portion in opposite directions of the debris removal portion, wherein the second slot of the lever arm has a same shape as a section of the extension portion.

10. A device of an inlet actuator, the device comprising:
    a housing;
    an actuator mounted in the housing, the actuator configured to be operated in response to a connection state of a charging plug;
    a drive shaft configured to be rotated in conjunction with an operation of the actuator, the drive shaft comprising a gear part configured to be axially rotated together with the drive shaft;
    a lever arm rotatably provided outside the housing and connected to the drive shaft to be rotated together with the drive shaft; and
    a brush unit seated on the lever arm and configured to remove debris between the housing and the lever arm while being in contact with the housing during operation of the lever arm, wherein the brush unit comprises:
       a connection portion connected to and arranged to be perpendicular to the drive shaft and engaged with the gear part; and
       an extension portion extended from the connection portion along the lever arm and comprising a debris removal portion in contact with the housing.

11. The device of claim 10, wherein:
    the lever arm comprises a seating groove portion depressed from the lever arm to receive the brush unit; and
    the connection portion and the extension portion of the brush unit have circular circumferential surfaces so as to be rotatable in a seated state in the seating groove portion.

12. The device of claim 11, wherein the connection portion of the brush unit comprises a gear connection section and a rotation section arranged along an outer circumferential surface thereof, the gear connection section being engaged to the gear part and the rotation section being inserted in the seating groove portion and shaped in an arc shape.

13. The device of claim 12, wherein in response to the drive shaft being rotated, the brush unit is configured to move together with the lever arm and perform a tilting movement, and the debris removal portion is configured to be rotated in a trajectory along the arc shape.

14. The device of claim 13, wherein a portion of the housing in contact with the debris removal portion is shaped in a curved surface along the trajectory of rotation of the debris removal portion.

15. A vehicle comprising:
    a vehicle body;
    a housing provided in the vehicle body;
    an actuator mounted in the housing and configured to be operated in response to a connection state of a charging plug;
    a drive shaft configured to be rotated in conjunction with an operation of the actuator;
    a lever arm rotatably provided outside the housing and connected to the drive shaft to be rotated together with the drive shaft; and
    a brush unit seated on the lever arm and configured to remove debris between the housing and the lever arm while being in contact with the housing during operation of the lever arm.

16. The vehicle of claim 15, wherein the brush unit comprises:
    a connection portion connected to the drive shaft; and
    an extension portion extended from the connection portion along the lever arm and comprising a debris removal portion in contact with the housing.

17. The vehicle of claim 16, wherein a section of the debris removal portion is gradually reduced in a width thereof toward the housing.

18. The vehicle of claim 16, wherein the debris removal portion comprises a plurality of elastic bodies, the plurality of elastic bodies being elastically deformable and arranged along the extension portion.

19. The vehicle of claim 16, wherein the brush unit comprises the connection portion and the extension portion that are removably provided, and the debris removal portion is rotatably connected to the extension portion.

20. The vehicle of claim 19, wherein the lever arm comprises:
- a first slot configured to receive the connection portion therein; and
- a second slot in communication with the first slot and extended to receive the debris removal portion in a longitudinal direction thereof.

* * * * *